United States Patent [19]

Tanaka et al.

[11] Patent Number: 5,778,261
[45] Date of Patent: Jul. 7, 1998

[54] CAMERA WITH A PARALLAX COMPENSATION APPARATUS

[75] Inventors: Etsuo Tanaka, Tokyo; Yoichi Koizumi, Kawagoe, both of Japan

[73] Assignee: Nikon Corporation, Tokyo, Japan

[21] Appl. No.: 770,577

[22] Filed: Dec. 19, 1996

Related U.S. Application Data

[63] Continuation of Ser. No. 453,672, May 30, 1995, abandoned, which is a continuation of Ser. No. 175,509, Dec. 30, 1993, abandoned.

[30] Foreign Application Priority Data

Jan. 6, 1993 [JP] Japan ...................................... 5-015864

[51] Int. Cl.$^6$ .............................................. G03B 17/00
[52] U.S. Cl. .............................................. 396/55; 396/377
[58] Field of Search ............................ 396/52, 53, 54, 396/55, 377

[56] References Cited

U.S. PATENT DOCUMENTS 4,589,749  5/1986  Strobel .................................... 354/221
5,170,255  12/1992  Yamada et al. .......................... 354/430
5,172,150  12/1992  Teramota et al. ....................... 354/202
5,237,363  8/1993  Okada et al. ............................ 354/412

FOREIGN PATENT DOCUMENTS 4-51028  2/1992  Japan .

Primary Examiner—Russell E. Adams

[57] ABSTRACT

A camera, equipped with a viewfinder having an optical axis different from the optical axis of the photographic lens system, has a parallax compensation apparatus for compensating for the parallax between the viewfinder and the photographic lens system. The parallax compensation apparatus includes a distance measuring device which measures an object's distance from the camera and an optical axis moving device which moves the optical axis of the photographic lens system according to the parallax, which is based on the results received from the distance measuring device, thereby matching the photographic image plane with the viewfinder field. In addition, the optical axis moving device moves the optical axis of the photographic lens system to compensate for hand trembling or other motion of the camera during shooting.

10 Claims, 5 Drawing Sheets

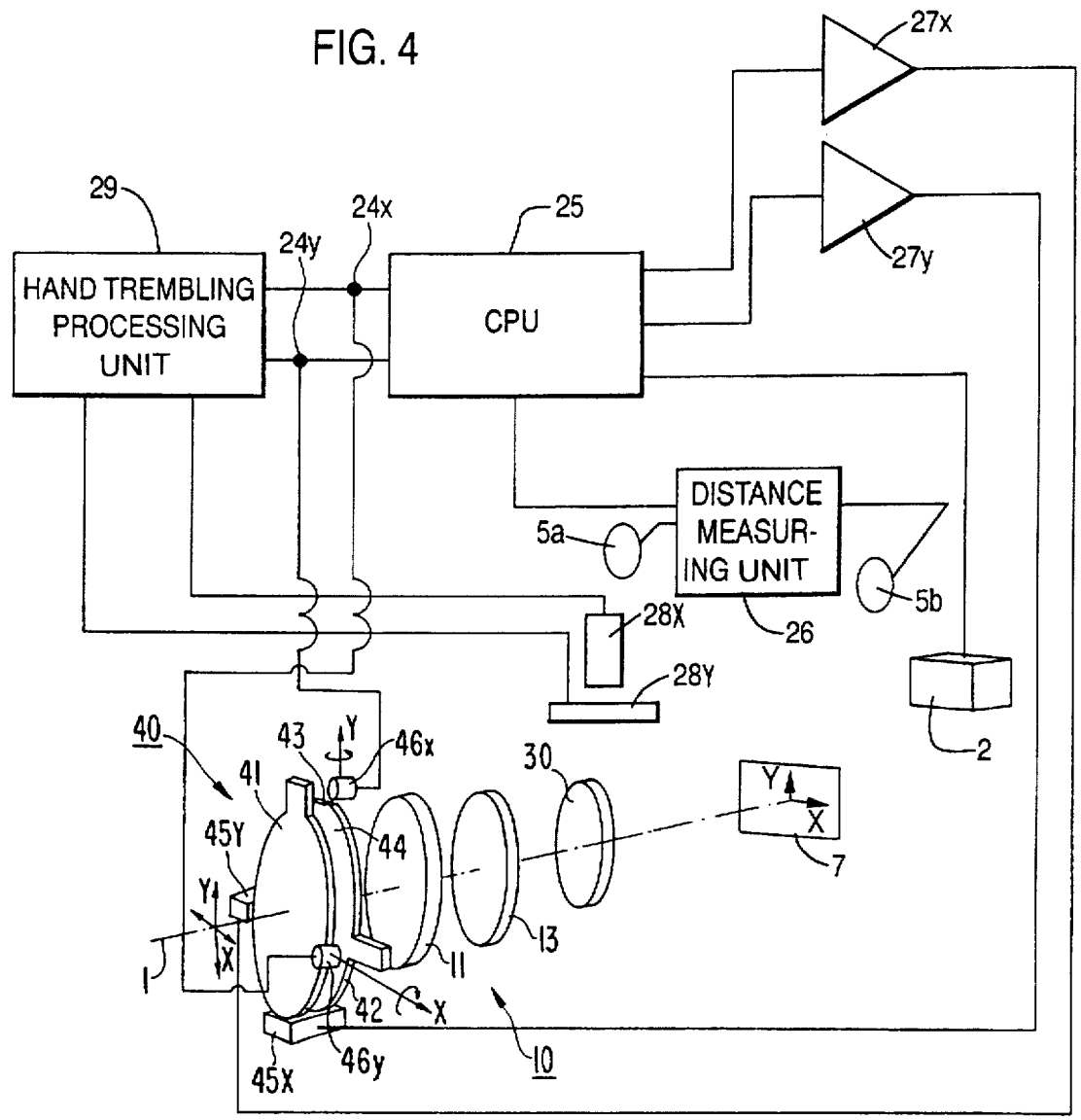

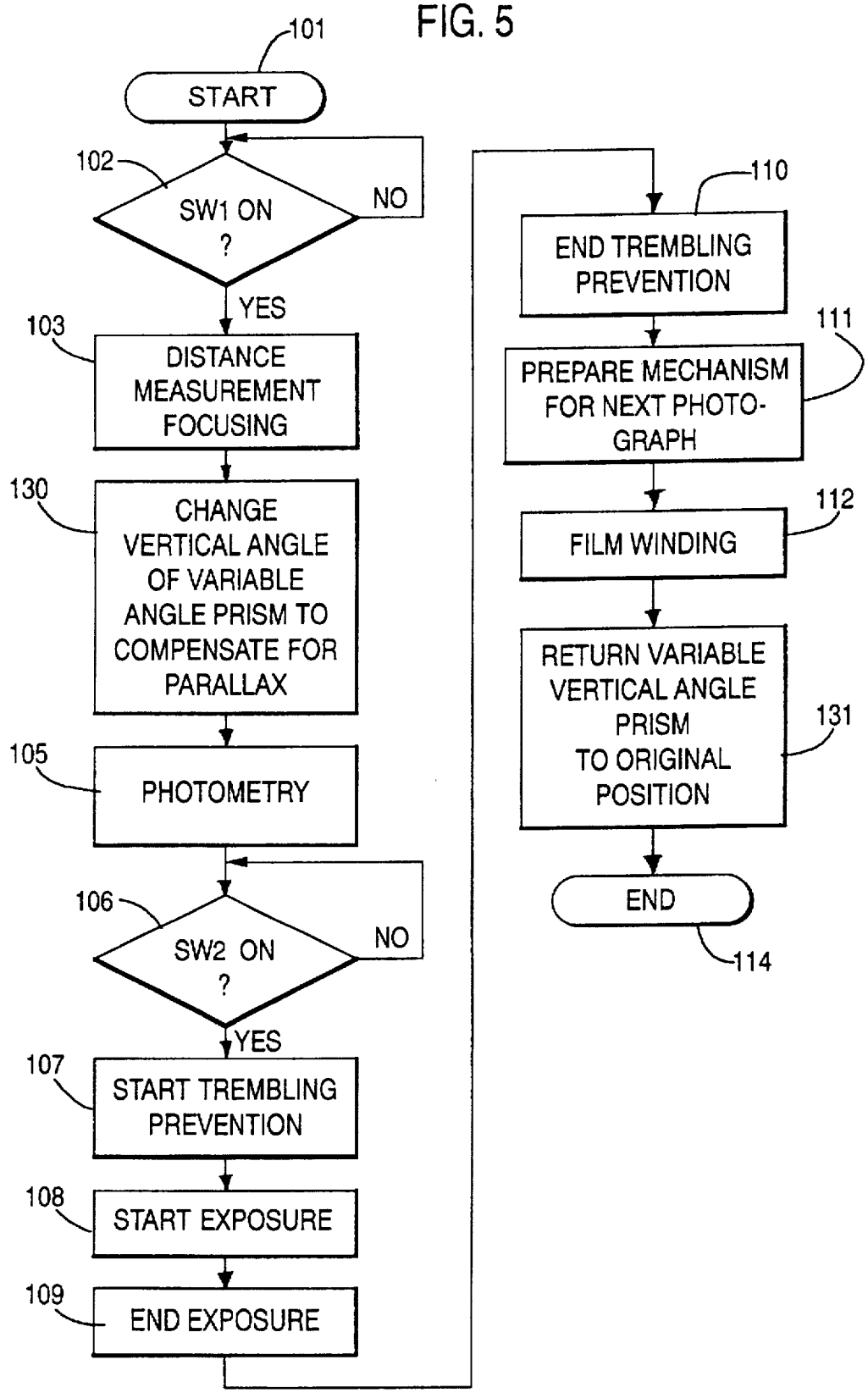

CAMERA WITH A PARALLAX COMPENSATION APPARATUS

This application is a continuation of application No. 08/453,672, filed May 30, 1995, which is a continuation of 08/175,509, filed Dec. 30, 1993, both now abandoned.

BACKGROUND OF THE INVENTION

1. Field of the Invention

In a camera equipped with a viewfinder having an optical axis different from the optical axis of the photographic lens system, as the optical axes are spaced apart from each other, a discrepancy occurs between the field provided by the photographic lens system and the lens of the viewfinder, thereby generating a parallax between the viewfinder image and image on the image plane. In particular, this phenomenon is more noticeable as the distance between an object to be photographed and the camera is decreased.

The present invention relates to a parallax compensation apparatus in a camera having a viewfinder and a photographic lens system with different optical axes, which compensates for the parallax occurring between the optical axis of the viewfinder and the optical axis of the photographic lens system.

2. Description of the Related Art

In a conventional camera, various techniques have been suggested to compensate for this parallax phenomenon. These techniques include a parallax compensating apparatus which (1) adds for a close distance object, as shown in FIG. 6, a compensating limit b within a field limit a of the viewfinder based upon the object's distance from the camera, (2) moves the field limit of the viewfinder according to the object's distance from the camera, or (3) brings the photographic lens forward while tilting the photographic lens in dependence upon the object's distance from the camera.

However, in such a conventional parallax compensating apparatus described above, various problems occur in practical operation. More specifically, in the first aforementioned conventional example, such problems as complicated use and difficult handling exist, since the viewfinder limit (compensating limit b) for a close distance object must be used according to the object's distance. Additionally, in the second and third examples, the mechanical structure becomes more complex because it is necessary to integrate a mechanism which moves the viewfinder field limit or brings the photographic lens forward while tilting it.

Other conventional cameras have trembling proof devices which counter the effect of hand trembling or other motion of the camera during shooting. One such trembling proof device has a moving lens which is moved in a plane perpendicular to the optical axis of the photographic lens system and another such trembling proof device has a variable vertical angle prism for bending the optical axis of the photographic lens system. However, these conventional cameras either do not compensate for parallax or require a separate parallax compensation circuit to perform such a function.

SUMMARY OF THE INVENTION

The present invention takes into account the problems associated with the conventional cameras and, as a result, has as one of its objects, to provide a camera with a parallax compensating apparatus having a simple mechanical configuration and is also used for other mechanisms integrated in the camera, wherein the parallax compensating apparatus compensates for the parallax between the optical axes of the photographic lens system and the viewfinder lens system.

The foregoing object and other objects of the invention are achieved by a parallax compensating apparatus comprising distance measuring means for measuring an object's distance from the camera, a moving lens that moves in a plane perpendicular to the optical axis of the photographic lens system or a variable vertical angle prism for bending the optical axis of the photographic lens system, and a photographic lens system optical axis moving means that is used as a hand trembling proof means to prevent or correct for hand trembling in a camera equipped with a viewfinder having an optical axis different from the optical axis of the photographic lens system. In other words, the parallax compensating apparatus of the present invention compensates for the parallax by moving the optical axis of the photographic lens system to the required locations by combining the optical system of the hand trembling proof means and the distance measuring means.

BRIEF DESCRIPTION OF THE DRAWINGS

The above-mentioned and other objects and advantages of the present invention will become apparent and more readily appreciated from the following description of the preferred embodiments, taken in conjunction with the accompanying drawings, of which:

FIG. 4 is a schematic drawing showing the configuration of a second embodiment of the entire parallax compensating apparatus according to the present invention.

FIG. 5 is a flow chart explaining the control of the parallax compensating apparatus according to the second embodiment of the present invention.

DETAILED DESCRIPTION OF THE PREFERRED EMBODIMENTS

Figure 1:
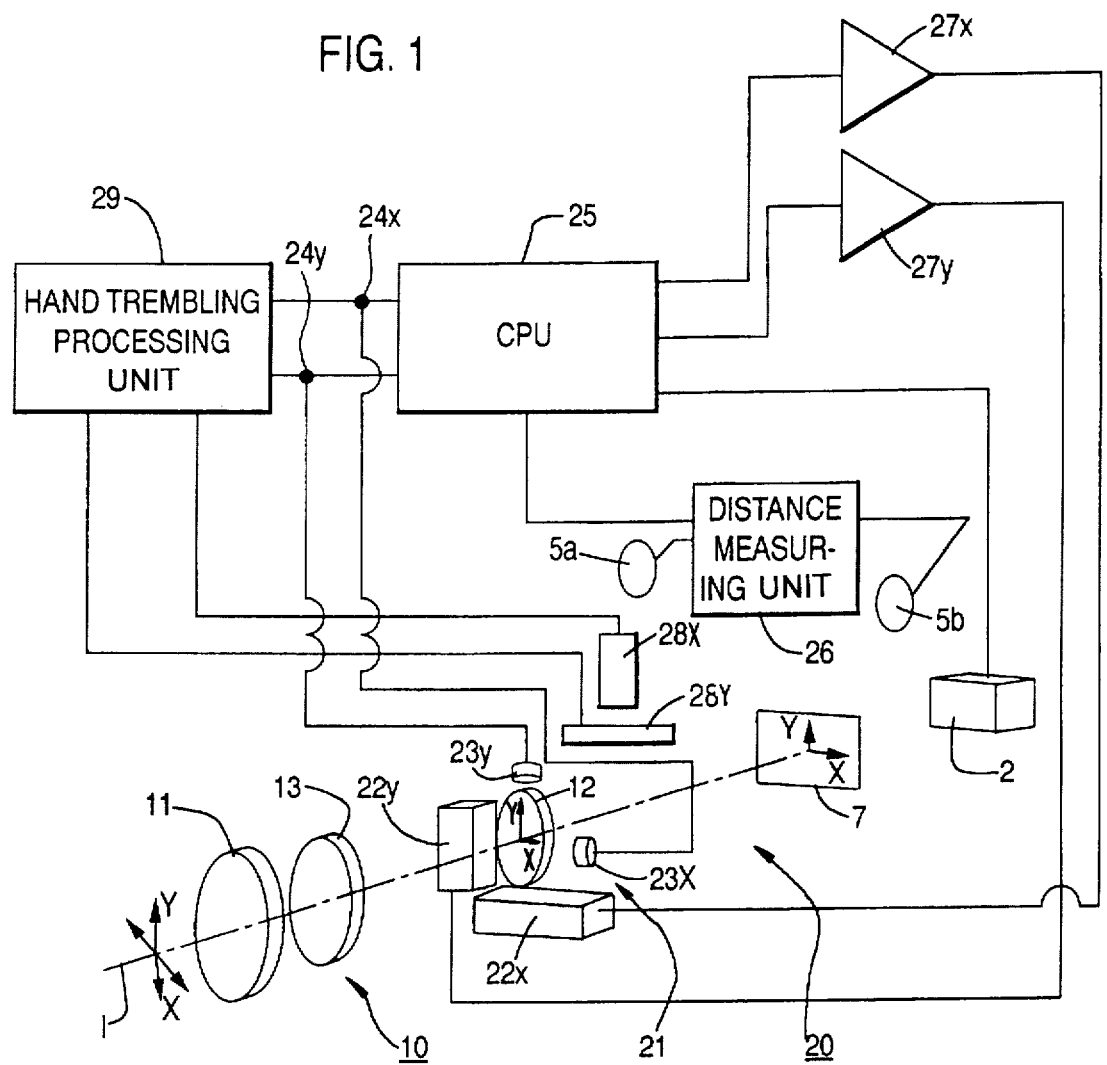
FIG. 1 is a schematic drawing showing the configuration of a first embodiment of the entire parallax compensating apparatus according to the present invention.

Reference will now be made in detail to the present preferred embodiments of the present invention, examples of which are illustrated in the accompanying drawings, wherein like reference numerals refer to like elements throughout.

According to the present invention, a distance between an object to be photographed and a camera is measured once by a distance measuring device to calculate parallax between an optical axis of a viewfinder and an optical axis of a photographic lens system so that a hand trembling proof device (i.e., to remove the trembling effect caused by the hands of a user on a photographic image plane), which is a photographic lens system optical axis moving unit, is moved accordingly. Thereby, the optical axis of the photographic lens system is displaced to correspond to the optical axis of the viewfinder system to match the viewfinder field and photographic image plane. Additionally, the trembling correction function, i.e., by the trembling proof device which is also the aforementioned photographic lens system optical axis moving means, is performed simultaneously with the aforementioned parallax compensation.

Figure 2:
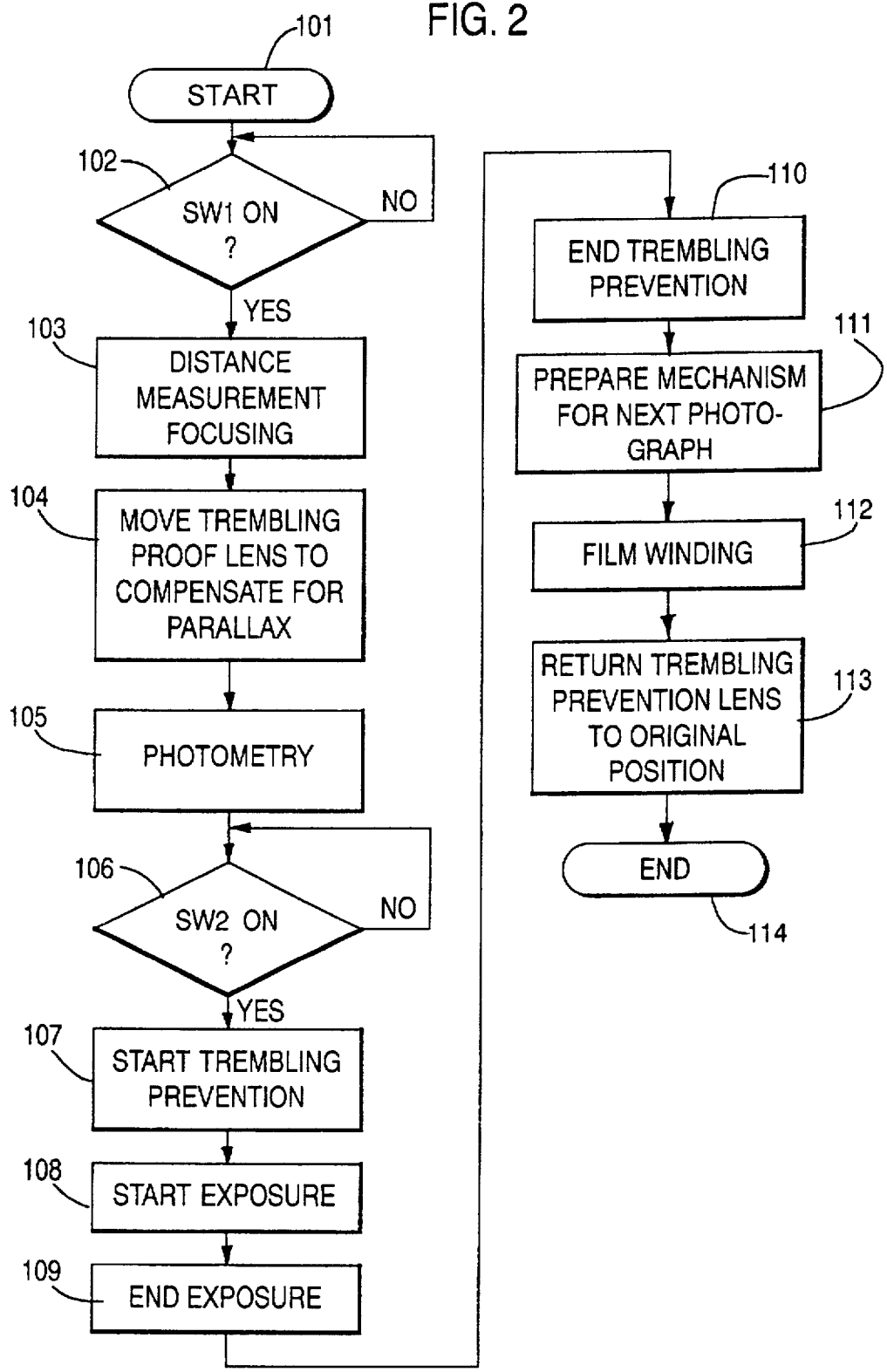
FIG. 2 is a flow chart explaining the control of the parallax compensating apparatus according to the first embodiment of the present invention.
Figure 3:
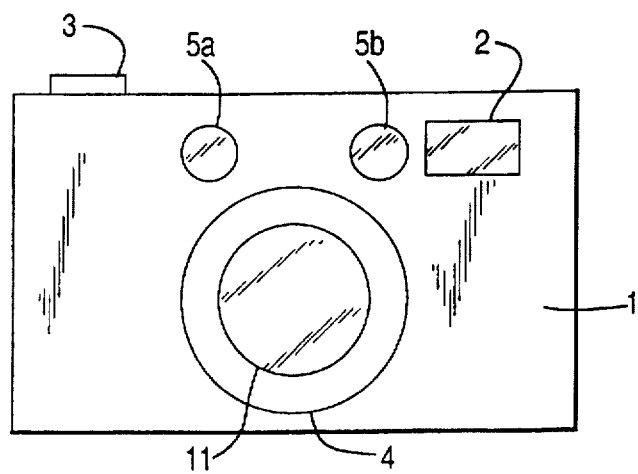
FIG. 3 is a drawing of an exterior of a camera equipped with a suitable viewfinder according to the present invention.
Figure 6:
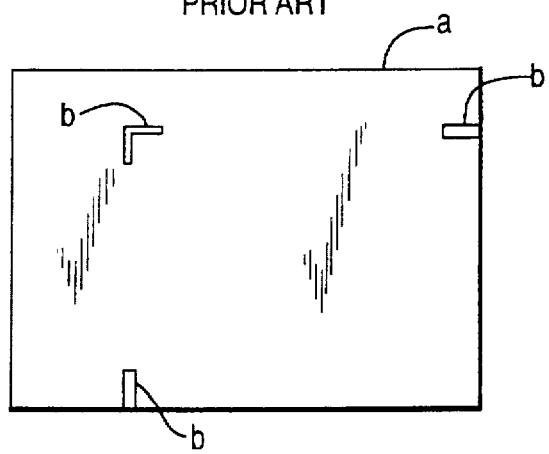
FIG. 6 is a schematic view of the parallax compensation limit in a camera equipped with a conventional viewfinder and parallax compensating apparatus.

FIGS. 1 through 3 show a first embodiment of a parallax compensating apparatus according to the present invention. FIG. 3 is used to briefly explain the outline of the configuration of a camera equipped with a suitable viewfinder that incorporates the first embodiment of the present invention. Specifically, in FIG. 3, there is provided a camera body 1 of a camera, a viewfinder 2, a release button 3 placed near one end of the top portion of camera body 1, a lens barrel 4 that is positioned at the center of the front part of camera body 1, a photographic lens system 10 (illustrated in FIG. 1) which is retained therein, and distance measuring elements 5a and 5b that comprise a distance measuring device to measure an object's distance from the camera.

As shown in FIG. 1, photographic lens system 10 comprises a primary lens group 11 and a secondary lens group 13 which performs focusing by moving in the direction of optical axis I, and hand tremor prevention lens group 12. The primary lens group 11 and the secondary lens group 12.13 are retained in lens barrel 4 (FIG. 3), and the hand tremor prevention lens group 12 (hereinafter referred to as "trembling proof lens" and being the tertiary lens group) is placed with free mobility within the plane perpendicular to optical axis I (see FIG. 1). Normally, optical axis I (perpendicular to the surface of the FIG. 3 drawing) passes through the center of the photographic lens system. Additionally, the aforementioned viewfinder 2 has, similar to the aforementioned primary lens group 11, a viewfinder system optical axis passing through its center (in the direction perpendicular to the surface of the FIG. 3 drawing). In a camera equipped with viewfinder 2, as described above, optical axis I of the photographic lens system 10 and the optical axis of viewfinder 2 separately pass through in the direction perpendicular to the surface of the FIG. 3 drawing, such that the discrepancy between these two optical axes has been a cause for the occurrence of parallax.

According to the present invention as described above, camera body 1 is equipped with viewfinder 2 that has an optical axis different from optical axis I of the photographic lens system 10, and a parallax compensating apparatus 20 comprises measuring elements 5a and 5b that form a distance measuring unit for measuring an object's distance from the camera and photographic lens system optical axis moving unit 21, composed of trembling proof lens 12 that moves within a plane perpendicular to optical axis I of photographic lens system 10, that is used as a hand trembling proof or prevention unit for preventing the negative effects of hand trembling during photographic opration.

As shown in FIG. 1, actuators 22x and 22y move trembling proof lens 12 towards the X, Y directions, respectively, such that the X and Y directions cross each other at a right angle within a surface area perpendicular to optical axis I. As a result of the trembling proof lens 12 moving in the X and Y directions, optical axis I moves in parallel and an image on image plane 7 is moved in the X and Y directions. Furthermore, in FIG. 1, lens position detecting sensors 23x and 23y detect where trembling proof lens 12 is located in the X, Y directions. Points 24x and 24y are the merging points for the return in the signal transmission path from sensors 23x and 23y.

Distance measuring unit 26 calculates the object's distance from the camera according to the output from the aforementioned distance measuring elements 5a and 5b. The distance to the object obtained by distance measuring unit 26 is sent to CPU 25.

In CPU 25, calculations are performed regarding how much trembling proof lens 12 should be moved from a current position based on the distance to the object being photographed in order to compensate for parallax. Based on its results, CPU 25 is configured to activate aforementioned actuators 22x and 22y via amplifiers 27x and 27y, thereby moving trembling proof lens 12 in the required X and Y directions.

In the above noted configuration, distance is measured by distance measuring elements 5a and 5b to calculate parallax at distance measuring means 26. Accordingly, trembling proof lens 12 of photographic lens system optical axis moving means 21 is moved in the X, Y directions, thereby displacing optical axis I of photographic lens system 10 to be in accord with the optical axis of viewfinder 2. As a result, an image on the aforementioned image plane 7, which is a photographic image plane, is moved so as not to create parallax with viewfinder 2, thereby matching the image with the viewfinder field and enabling parallax compensation.

Here, the movement of trembling proof lens 12 is determined by distance measuring means 26 because the amount of compensation for the aforementioned parallax differs depending on an object's distance from the camera. And, as noted above, the parallax compensation apparatus 20 includes distance measuring unit 26, trembling proof lens 12, CPU 25, and actuators 22x and 2y and so on.

Furthermore, FIG. 1 shows camera shaking detectors 28x and 28y which are two angular velocity sensors used in this embodiment. More specifically, angular velocity sensor 28x detects rotating conditions of the camera around the Y-axis on the image plane and angular velocity sensor 28y detects the rotation of the camera around the X-axis on the image plane.

These two angular velocity sensors 28x and 28y are connected to hand trembling processing unit 29 to calculate the hand trembling movement of the camera. This hand trembling processing unit 29 is connected to CPU 25 to calculate in what direction the aforementioned trembling proof lens 12 should be moved so that the images on photographic image plane 7 do not move, or the effect of camera trembling does not occur. The output of CPU 25 moves the aforementioned actuators 22x and 22y via amplifiers 27x and 27y, thereby moving trembling proof lens 12 to prevent trembling of photographic image plane 7, which removes the effects of hand trembling.

In other words, trembling proof lens 12 is, as previously described, photographic lens system optical axis moving unit 21 which serves as hand trembling proof or prevention unit by moving optical axis I and the first embodiment of the present invention is characterized by the effective utilization of photographic lens system optical axis unit 21.

More specifically, in modern cameras, research and development are underway for producing an anti-tremor type camera whereby photographic shooting can be done with no trembling effects of the images, even if trembling actually occurs. Cameras of this type, that use a hand trembling proof device which immobilizes the location of the image on the film surface (photographic image plane 7) regardless of the movement of the camera, whereby a part of photographic lens group 10 in photographic lens barrel 4 is moved within the plane perpendicular to photographic lens optical axis I, thereby shifting the optical axis of the moving side lens (trembling proof lens 12), are known. And, with this type of tremor prevention device, it is possible to move the photographic image plane 7 regardless of the movement of the camera.

Therefore, it is possible to compensate for parallax that occurs between photographic lens system 10 and the viewfinder system in a camera equipped with viewfinder 2, by using a hand tremor prevention (trembling proof) device, as described above. However, such parallax fluctuates depending on the object's distance from the camera and, thus, this aspect must be taken into consideration.

The present invention enables the ability to compensate for parallax in a camera equipped with viewfinder 2 by combining the optical system of the aforementioned trembling proof device and distance measuring devices (e.g., elements 26, 5a and 5b in the first embodiment), thereby moving optical axis I of photographic lens system 10 into the required position. That is, when this type of configuration is adopted, it becomes possible for photographic lens system 10 equipped with a trembling proof (hand tremor prevention) device to move photographic image plane 7 by moving trembling proof lens 12 in lens barrel 4. Also, the present invention takes into consideration the fact that parallax differs depending on the object's distance from the camera as optical axis I of photographic lens system 10 and the optical axis of the viewfinder system are distinct.

The present invention matches the viewfinder field and the photographic image plane 7 by measuring the distance once to calculate the parallax and move the image plane of the trembling proof device, which is the photographic lens system optical axis moving unit 21, accordingly. Here, hand tremor prevention in the camera is done mainly for the image plane that has been moved by the aforementioned parallax compensation.

As a result, according to the above-noted configuration, it is no longer necessary for special installation of a device exclusively for parallax compensation because a trembling proof (hand tremor prevention) device, which is photographic lens system optical axis moving unit 21, is also used as a parallax compensating apparatus.

FIG. 2 is a flow chart explaining the operating state in a camera equipped with a trembling proof (hand tremor prevention) device which also serves as a parallax compensating apparatus as configured above. To briefly explain this, a camera is held at the beginning of step (hereinafter abbreviated as "S") 101.

Subsequently, release button 3 is half pushed at S102 so that switch 1 (referred to as "SW1") is switched to turn ON the power for the camera, in preparation of shooting.

At S103, the distance from a camera to the subject is measured with distance measuring elements 5a, 5b and distance measuring unit 26 to perform focusing. Then, at S104, based on the data for distance measurement to the subject, trembling proof lens 12 is moved to shift optical axis I of photographic lens system 10, thereby compensating for parallax with viewfinder 2.

Subsequently, at S105, photometry is performed at photometry elements, not shown in FIG. 2, to determine the aperture and shutter speed. Then, at S106, release button 3 is fully pushed and switch 2 ("SW2") is turned on to start the photographic operation. More specifically, at S107, trembling proof lens 12 in photographic lens system 10 is moved to initiate the trembling prevention or removal operation for photographic image plane 7 against hand trembling.

At S108, a shutter (not shown in FIG. 2) is opened to start exposure onto photographic image plane 7. At S109, the shutter is closed to end the exposure onto photographic image plane 7. Furthermore, at S110, trembling proof lens 12 is stopped by returning it to the location where parallax has been compensated for, thereby completing the trembling removal operation.

Additionally, at S111, a mechanism is charged on a camera; at S112, film is spooled; at S113, trembling proof lens 12 is returned to the original position in the center of optical axis in lens barrel 4; and at S114, the shooting operation is completed.

In this type of operation control, chromatic aberrations, due to a prism effect, do not occur as trembling proof lens 12 is moved and operated within the plane perpendicular to optical axis I of photographic lens system 10. In addition, there is a benefit of being able to configure a smaller camera since a group of lenses are moved as trembling proof lens 12.

FIGS. 4 and 5 show a second embodiment of a parallax compensating apparatus according to the present invention. In these figures, those elements that are identical to, or equivalent with the elements of the first embodiment in aforementioned FIGS. 1 through 3, are assigned with identical numbers and a detailed explanation is omitted.

In the second embodiment, parallax compensation is made by placing variable vertical angle prism 40, in which the vertical angle of a prism is changeable (as is well known, a prism that can bend an incident ray in various directions is called a variable vertical angle prism), at the object side (left side in FIG. 4) in primary lens group 11 of photographic lens system 10, thereby bending optical axis I in photographic lens system 10. As shown in FIG. 4, a group of image forming lenses 30 is provided in photographic lens system 10.

The aforementioned variable vertical angle prism 40 comprises a pair of plate glasses 41 and 42, and the surrounding, thereof, is joined by bellow 43. And, it is so configured that plate glass 41 is movable about the X-axis and plate glass 42 is movable about the Y-axis. The area between plate glasses 41 and 42 is filled with liquid 44 that has approximately the same refractive index as that of the plate glasses 41 and 42.

When plate glasses 41 and 42 are no longer in parallel in variable vertical angle prism 40, a prism is formed due to the effect of plate glasses 41, 42, bellow 43, and liquid 44, thereby bending incident rays. Consequently, by varying the relative angles formed by plate glasses 41 and 42, a prism with various vertical angles is formed, thereby enabling the bending of the incident rays in various directions.

In FIG. 4, actuator 45x tilts plate glass 41 around the X-axis and actuator 46y tilts plate glass 42 around the Y-axis. The vertical angle of variable vertical angle prism 40 can be changed by moving the plate glasses 41 and 42.

Sensors 46x and 46y detect the vertical angle of variable vertical angle prism 40. By entering the output of sensors 46x and 46y in CPU 25, it can be verified as to how much the ray is bent by variable vertical angle prism 40, thereby, bending optical axis I of photographic lens system 10, and, in turn, shifting the images on photographic image plane 7.

In effect, by activating variable vertical angle prism 40, optical axis I is bent, thereby shifting the images on photographic image plane 7. Furthermore, in this second embodiment, a distance to the object is measured by distance measuring means such as unit 26. Subsequently, the optical axis may be bent by moving the vertical angle of variable vertical angle prism 40 with signals from CPU 25 so that images on photographic image plane 7 and the field viewfinder 2 match. The optical axis is bent at variable vertical angle prism 40 to match the images on photographic image plane 7 and the field of viewfinder 2, thereby compensating for parallax.

In addition to the above, variable vertical angle prism 40 can serve as a photographic lens system optical axis moving unit that also functions as a trembling proof (tremor prevention) device to achieve tremor prevention capability for photographic image plane 7 by detecting the conditions of camera tremor upon processing the signals from angular velocity sensors 28x and 28y at hand trembling processing unit 29, thereby changing the vertical angle through CPU 25 and bending the optical axis.

A recent trembling proof (hand tremor prevention) type camera that allows shooting in conditions where images do not appear shaken even if hand trembling occurs, due to a trembling proof (hand tremor prevention) device, that uses tremor prevention lens 12 shown in the aforementioned second embodiment, wherein variable vertical angle prism 40 can freely change the angle between the incident surface and the exit surface of the prism, thereby immobilizing the position of the image on the film surface (photographic image plane 7) regardless of the movement of the camera, is also known. In such a device, the photographic image plane 7 may be moved regardless of the movement of the camera.

However, in this second embodiment, by utilizing variable vertical angle prism 40 as a trembling proof (hand tremor prevention) device and combining a distance measurement device thereto, optical axis I of photographic lens system 10 is moved to the required position, thereby achieving compensation for parallax in a camera equipped with viewfinder 2. Operation of a camera, according to the second embodiment, having a variable vertical angle prism 40 which is used as both a trembling proof (hand tremor prevention) device and a parallax compensating apparatus is indicated in the flow chart of FIG. 5. A majority of the operation steps are the same as the operation steps in FIG. 2 for the aforementioned first embodiment and, as a result, a detailed explanation is omitted.

An operational difference in this second embodiment over the first embodiment is in step S130, whereby the vertical angle of variable vertical angle prism 40 is changed according to the distance measurement to the object, thereby bending optical axis I of photographic lens system 10 and matching photographic image plane 7 and the field viewfinder 2, to provide compensation for parallax for viewfinder 2, after distance measurement focusing is performed at S103 while SW1 is turned ON during a half push operation.

Additionally, between the times when trembling prevention starts at S107 and when trembling prevention ends at S110, a trembling prevention operation is performed, wherein a vertical angle of variable vertical angle prism 40 is moved, thereby bending optical axis I of photographic lens system 10.

Furthermore, when the shooting operation ends, after the film winding step in S112, sometimes a variable vertical angle prism original position return operation may be performed to return plate glasses 41 and 42 of variable vertical angle prism 40 in parallel and, thereby returning optical axis I of photographic lens system 10 back to its original position.

Additionally, in this second embodiment, greater compensation for parallax is possible as optical axis I is bent at variable vertical angle prism 40.

Needless to say, the present invention is not limited to the aforementioned embodiments, and the shape, configuration, etc., of each component of a camera that is equipped with viewfinder 2 as well as parallax compensating apparatus 20, may be altered or modified as necessary and fall within the scope of the present invention.

In essence, any camera equipped with a viewfinder that has a different optical axis from optical axis I of photographic lens system 10, may be configured so that photographic lens system optical moving unit (e.g., elements 21, 40 in the described embodiments), functioning differently from a parallax compensating apparatus that is capable of providing variable control for optical axis I of a photographic lens system (e.g., element 10 in the described embodiments), may be used for compensation for parallax by being combined with a distance measuring means (e.g., elements 5a, 5b and 26 in the described embodiments).

According to the parallax compensating apparatus of the present invention as described above, a camera equipped with a viewfinder that has an optical axis different from the optical axis of the photographic lens system (any camera which is not a Single Lens Reflex (SLR) camera) is so configured as to have a distance measuring unit to measure the object distance, and a photographic lens system optical axis moving unit that also serves as a trembling proof (tremor prevention) unit to prevent hand trembling and that has a moving lens that moves within the plane perpendicular to the optical axis of the photographic lens system or a variable vertical angle prism to bend the optical axis of the photographic lens system, thereby accomplishing various outstanding effects as noted below, despite its simple configuration.

Because the photographic lens system optical axis moving unit, as represented by a trembling proof (hand tremor prevention) device, and distance measuring unit are used to compensate and eliminate parallax due to different optical axes of a viewfinder and a photographic lens system, a mechanism exclusively for compensating for parallax does not need to be installed, thereby simplifying the entire configuration of a camera, accomplishing both operations while reducing size and cost.

Because parallax is compensated for and eliminated with the use of a trembling proof (hand tremor prevention) device comprising a moving lens that moves within the plane perpendicular to the optical axis of photographic lens system or a variable vertical angle prism for bending the optical axis of photographic lens system, it is effective for simultaneously solving hand trembling and compensating and eliminating parallax that may become a problem when shooting close up and using a viewfinder.

What is claimed is:

1. A parallax compensation apparatus for compensating for parallax in a camera used to photograph an object and having a viewfinder optical system with a first optical axis and a photographic lens system with a second optical axis different from the first optical axis, the parallax compensation apparatus comprising:
    a rangefinder measuring a distance of the object from the camera;
    a detection unit detecting movement of the camera prior to photographing the object;
    a moving unit moving the second optical axis; and
    a control unit driving the moving unit such that a picture plane of the camera matches a field of the viewfinder according to the distance measured by said rangefinder, and driving the moving unit to maintain a position of an image of the object on the picture plane according to the movement detected by the detecting unit.

2. The parallax compensation apparatus as claimed in claim 1, wherein said moving unit comprises:
    a moving lens driven by said control unit to move only in a plane perpendicular to the second optical axis according to the distance measured by said rangefinder and the movement detected by the detecting unit.

3. The parallax compensation apparatus as claimed in claim 1, wherein said moving unit comprises:

a variable vertical angle prism driven by said control unit to bend the second optical axis according to the distance measured by said rangefinder and the movement detected by the detecting unit.

4. A parallax compensation apparatus for compensating for parallax in a camera used to expose an image of an object onto an image plane and having a viewfinder optical system with a first optical axis and a photographic lens system with a second optical axis different from the first optical axis, the parallax compensation apparatus comprising:

a rangefinder measuring a distance of the object from the camera;

a detection unit detecting movement of the camera prior to photographing the object; and a moving unit moving the second optical axis such that a picture plane of the camera matches a field of the viewfinder according to the distance measured by said rangefinder, and moving the second optical axis to maintain a position of an image of the object on the picture plane according to the movement detected by the detecting unit.

5. The parallax compensation apparatus as claimed in claim 4, wherein said moving unit comprises:

a moving lens moving in a plane perpendicular to the second optical axis to move the second optical axis in order to match the field of the viewfinder with the picture plane of the camera in response to the distance measured by said rangefinder and to maintain the position of the image on the image plane in response to the movement detected by said detection unit.

6. The parallax compensation apparatus as claimed in claim 4, wherein said moving unit comprises:

a variable vertical angle prism bending the second optical axis in order to match the field of the viewfinder with the picture plane of the camera in response to the distance measured by said rangefinder and to maintain the position of the image on the image plane in response to the movement detected by said detection unit.

7. A parallax compensation apparatus for compensating for parallax in a camera used to expose an image of an object onto an image plane and having a viewfinder optical system with a first optical axis and a photographic lens system with a second optical axis different from the first optical axis, the parallax compensation apparatus comprising:

a distance measuring unit determining the distance between the object and the camera;

a motion detection unit having first and second angular velocity sensors detecting movement of the camera about first and second reference axes, respectively, said first axis being perpendicular to said second axis; and an optical axis moving unit moving the second optical axis to match the image plane of the camera with a field of the viewfinder based on the distance measured by said distance measuring unit and maintaining the position of the image on the image plane in response to the movement detected by said detection unit.

8. The parallax compensation apparatus as claimed in claim 7, wherein said optical axis moving unit comprises:

a moving lens moving in a plane perpendicular to the second optical axis in order to match the image plane of the camera with a field of the viewfinder based on the distance measured by said distance measuring unit and to maintain the position of the image on the image plane in response to the movement detected by said detection unit; and first and second actuators for driving the moving lens along said first and second axes, respectively.

9. The parallax compensation apparatus as claimed in claim 7, wherein said optical axis moving unit comprises:

a variable vertical angle prism bending the second optical axis in order to match the image plane of the camera with a field of the viewfinder based on the distance measured by said distance measuring unit and to maintain the position of the image on the image plane in response to the movement detected by said detection unit; and an actuation unit for driving the variable vertical angle prism.

10. The parallax compensation apparatus as claimed in claim 9, wherein:

said variable vertical angle prism comprises:

first and second plate glasses spaced apart from each other by a gap filled with liquid having a refractive index substantially the same as said first and second plate glasses;

first and second sensors detecting a vertical angle of the variable vertical angle prism; and said actuation unit comprises:

first and second actuators for tilting said first and second plate glasses about said first and second reference axes, respectively.

* * * * *